May 29, 1962

V. L. FRANTZ 3,036,597

CHECK-BLEED VALVE ASSEMBLY

Filed Nov. 12, 1958

INVENTOR
VIRGIL L. FRANTZ

BY *Wilmer Mechlin*

HIS ATTORNEY

INVENTOR
VIRGIL L. FRANTZ
BY *Wilmer Mechlin*
HIS ATTORNEY

May 29, 1962

V. L. FRANTZ 3,036,597

CHECK-BLEED VALVE ASSEMBLY

Filed Nov. 12, 1958

INVENTOR

VIRGIL L. FRANTZ

BY *Wilmer Mechlin*

HIS ATTORNEY

United States Patent Office 3,036,597
Patented May 29, 1962

3,036,597
CHECK-BLEED VALVE ASSEMBLY
Virgil L. Frantz, Salem, Va.
Filed Nov. 12, 1958, Ser. No. 773,211
18 Claims. (Cl. 137—620)

This invention relates to check-bleed valve assemblies for fluid pressure systems and has for its primary object the provision of an improved check-bleed valve assembly whereby any residual pressure in a line charged through the valve will be bled fully on shutting off of the charging pressure.

Another object of the invention is to provide an improved check-bleed valve assembly including a check-bleed valve and a relay valve for alternately connecting the check-bleed valve to charging pressure and to atmosphere, wherein the several operating parts are each contained in and removable as part of a subassembly without disconnecting any of the pipe connections to the assembly.

An additional object of the invention is to provide an improved check-bleed valve assembly which is fluid-actuatable for automatically charging and dumping a line and wherein all pipe connections are with a permanently mountable mounting bracket from which all operating parts are readily removable as parts of subassemblies.

A further object of the invention is to provide an improvide check-bleed valve which is so delayed in closing as to bleed to any predetermined degree residual pressure in a line charged through the valve on shutting off of the charging pressure.

Another object of the invention is to provide a check-bleed valve which is actuated by a pressure build-up in an associated pressure chamber, the latter being charged and exhausted through a common orifice alternately connectable to charging pressure and to atmosphere and of a size predetermined to bleed fully or to any other desired degree residual pressure in the line charged through the valve.

Other objects and advantages of the invention will appear hereinafter in the detailed description, be particularly pointed out in the appended claims and be illustrated in the accompanying drawings, in which:

Figure 2:
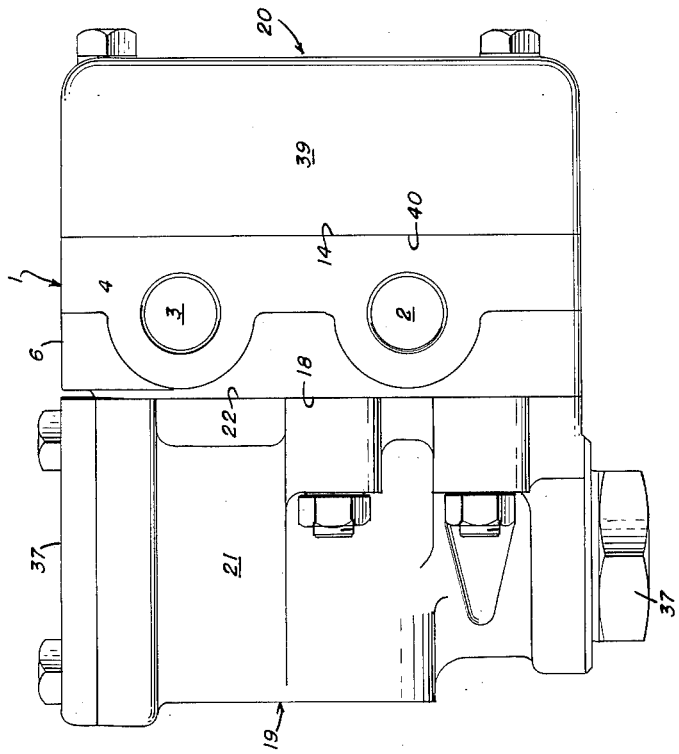
FIGURE 2 is a side elevational view of the assembly of FIGURE 1.
Figure 1:
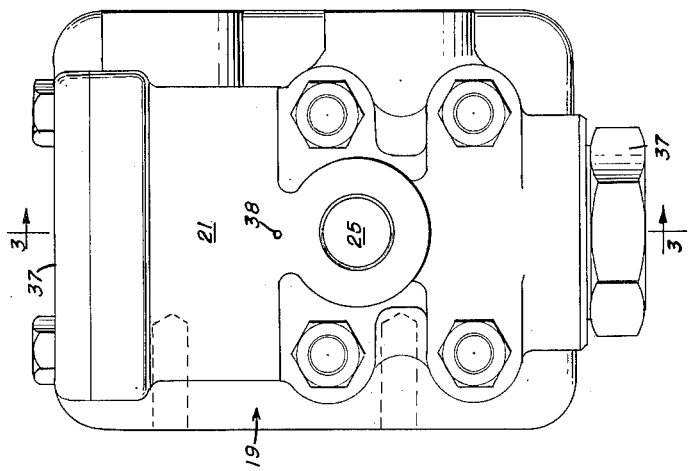
FIGURE 1 is an end elevational view of a preferred embodiment of the check-bleed valve assembly of the present invention.
Figure 3:
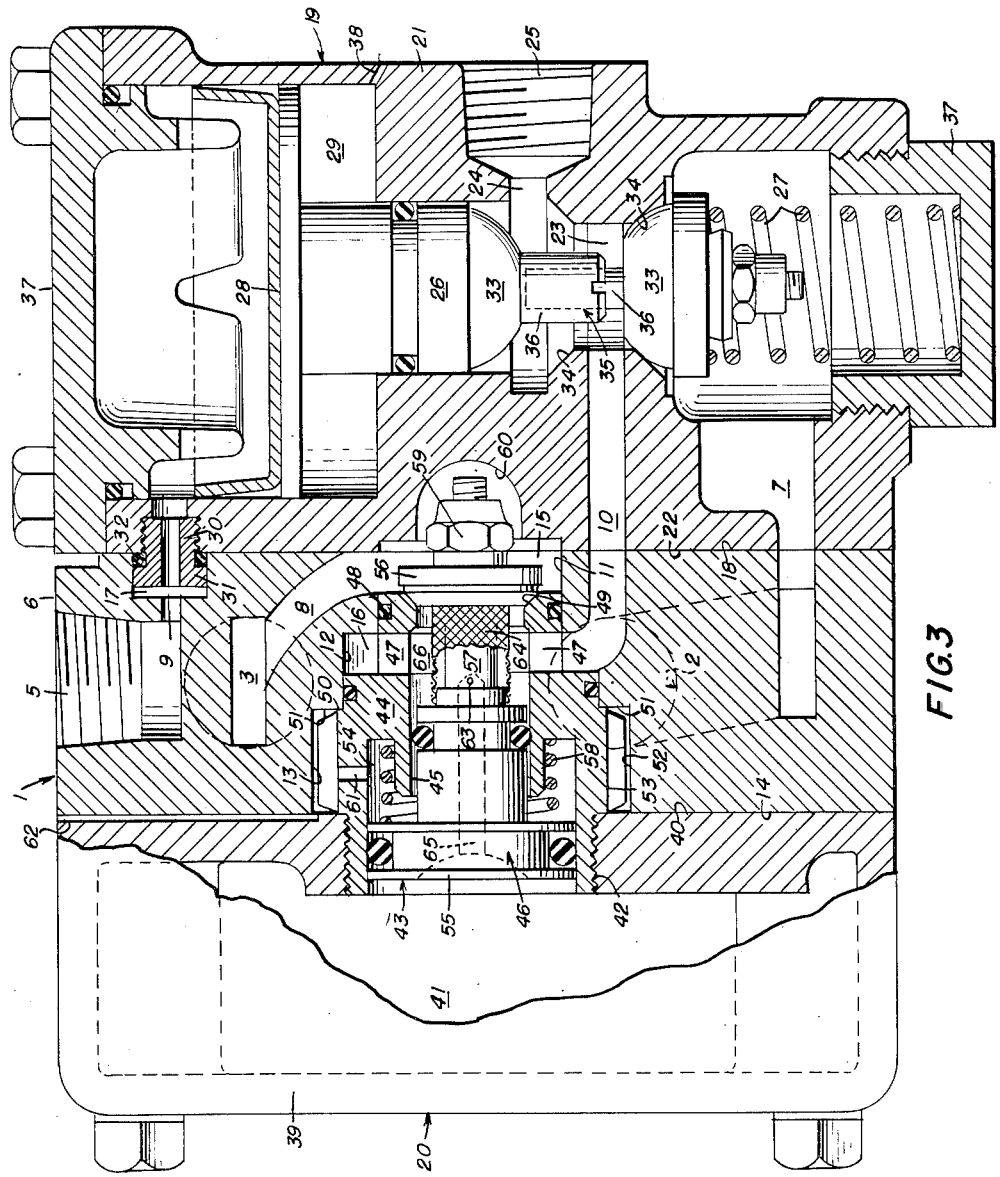
FIGURE 3 is a vertical sectional view on an enlarged scale taken along the lines 3—3 of FIGURE 1.
Figure 4:
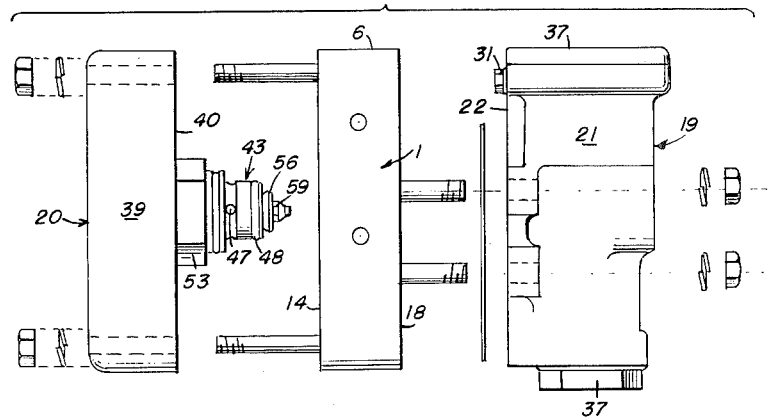
FIGURE 4 is an exploded view on a reduced scale of the assembly.
Figure 5:
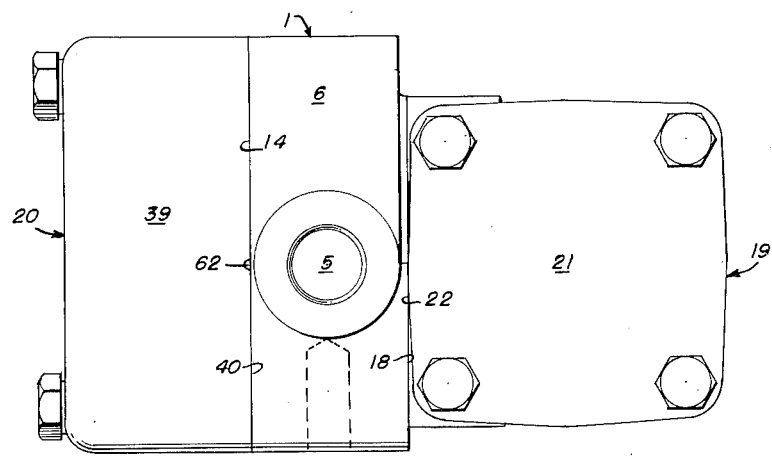
FIGURE 5 is a plan view of the assembly on the scale of FIGURES 1 and 2.

Referring now in detail to the drawings, in which like reference characters designate like parts, the improved check-bleed valve assembly of the present invention, while of general application, is particularly adapted for use in a system in pairs for controlling from either end the operation of one or more fluid-actuated devices connected in a line between the paired assemblies. Typical of such systems is a sanding system of a multiple unit diesel locomotive, the sanders of which must be operable from either end cab, and it is for such a system that the illustrated embodiment of the invention was specially designed.

The valve assembly is comprised of a mounting bracket or block 1, boltable or otherwise permanently mountable on a locomotive or other suitable support (not shown) and having or containing spaced, externally opening inlet and outlet ports 2 and 3, respectively, here conveniently formed in the same end 4 of the bracket. As their names imply, the inlet or inlet port 2 and outlet or outport 3 are connectable by suitable piping (not shown), respectively, to a main reservoir or other source of fluid pressure (not shown) and to a line or piping (not shown) beyond the valve assembly to which are connected one or more sanders or other fluid actuated devices (not shown). If, as is the illustrated embodiment, the valve assembly is designed for fluid actuation, the mounting bracket 1 will also contain or have formed in it an externally opening access port or opening 5, here conveniently formed in its top 6 and connectable to a control valve (not shown) in a cab or other suitable control station (not shown).

Interiorly, each of the ports 2, 3 and 5 is connected to one of a plurality of separate passages or ways formed at least in part in the mounting bracket 1, the inlet port to an inlet passage 7, the outlet port to an outlet passage 8 and the access port to an access passage 9. The outlet passage 8 and an intermediate, connecting or supply passage or way 10, also formed at least in part in the mounting bracket, and separate from the other passages, open radially at axially spaced positions, each onto one of a pair of axially spaced annular grooves 11 and 12 surrounding or preferably forming part of an aperture, opening or socket 13, centrally interrupting one side 14 of and extending therefrom into or through the mounting bracket. Between or intermediate the outlet and intermediate passages 8 and 10, the aperture 13 preferably is of circular cross-section and stepped or graduated to form a plurality of coaxial connected cylindrical portions or sockets of progressively decreasing cross-section, of which the groove 11 for the outlet passage 8 forms part of the inner end portion 15 and that 12 for the supply passage 10 forms part of the adjoining intermediate portion 16. The access passage 9 in turn opens onto a preferably cylindrical socket 17 opening inwardly from the opposite side 18 of the mounting bracket, the socket 17 being spaced radially or transversely from the aperture 13 and, therewith, being disposed substantially normal to the associated and thus, for the preferred substantially flat and parallel-sided bracket, both of the sides 14 and 18.

The subassemblies of the valve assembly of the preferred embodiment, other than the mounting bracket 1, are a relay or pilot valve subassembly 19 and a check-bleed valve subassembly 20, which together include or contain all of the working or operating parts or components of the assembly, the term "working or operating parts," as herein used, comprehending all moving parts as well as all other parts which are subjected to wear by any of the moving parts in the operation of the assembly. Of the two, the relay valve subassembly 19 includes a housing, body or block 21 bolted or otherwise releasably secured or attached to the mounting bracket 1 and having a side wall or side 22 conforming at least in part in contour to and engaging the confronting or adjoining side 18 of the bracket. Within the housing 21 is a valve chamber 23 which conveniently extends longitudinally of the housing and onto which open, at longitudinally or axially spaced positions, an exhaust passage 24 and an extension of the inlet passage 7 in the mounting bracket 1 and intermediate these passages an extension of the intermediate or supply passage 10. Of these several passages, all formed in part or whole in the housing 21, the exhaust passage 24 connects to an exteriorly opening exhaust port 25 contained or formed in the housing and either connectable through piping to, or, and preferably, opening directly onto the atmosphere.

Mounted or carried and reciprocable, slidable or shiftable longitudinally or axially in the valve chamber 23 within the housing 21 is a piston 26 valved alternately to connect the intermediate passage 10 to the exhaust passage 24 and to the inlet passage 7. Normally disposed, positioned or held, as by an axially acting coil spring or like yieldable means 27, in a position in which the intermediate passage 10 is connected to or communicates with the exhaust passage 24, the piston 26 may be solenoid actuated, but in the preferred embodiment, as previously mentioned, is actuated by fluid from a control valve to shift it to its alternate position in which it blocks off the exhaust passage 24 and port 25 and connects the intermediate passage, instead, to the inlet passage 7. Thus, the illustrated piston 26 is in the form of a differential piston, the enlarged head 28 of which slides, rides or is received in a recess 29 of corresponding size in the housing 21, the recess, above the head, being connected to or communicating with the access passage 9 in the mounting bracket 1. Such connection is made through a centrally apertured plug 30 secured to the housing as by threading it into an extension of the access passage therein and having an enlarged end 31 fitting into the socket 17 in the mounting bracket and carrying an O-ring or like sealing gasket 32 for sealing the passage about the joint between the bracket and the housing.

The valving of the differential piston 26 for alternately connecting the intermediate passage 10 to the exhaust and inlet passages 24 and 7 here is provided by a pair of oppositely facing, axially spaced valve elements 33 alternately seatable in a pair of similarly facing and spaced seats 34 in the valve chamber 23, each of which seats is interposed between the intermediate passage and one of the exhaust and inlet passages. For ready assembly and disassembly, the piston 26, between the valve elements 33, has a two-part stem 35, the parts 36 of which have a sliding, telescoping fit, so that each of the separable valve elements and its associated structure can be applied and removed through the adjoining end of the valve chamber 23, the latter for that purpose normally being closed at its ends by removable closure members or covers 37. To enable the illustrated differential piston 26 to be shifted quickly between its alternate positions by the oppositely acting forces of the actuating fluid and the coil or return spring 27 without resistance to either by entrapped fluid, both ends of the recess 29 are adapted to be bled to atmosphere, the lower through a bleed 38 and the upper through a like bleed or if, as here, the assembly is designed for a sander system, through the bleed (not shown) of the conventional sander control valve (not shown) which opens when the actuating fluid is cut off.

The second, or check-bleed valve subassembly 20 includes a hollow block, container or housing 39 bolted or otherwise releasably attached or secured to the mounting bracket 1 and, like the housing 21, having a side wall or side 40 conforming at least in part in configuration to and engaging the confronting or adjoining side 14 of the bracket. Contained in the container 39 is a pressure chamber or compartment 41 accessible through a boss-reinforced opening 42 preferably centrally through its bracket-confronting side wall 40 toward the mounting bracket 1 and aligned with the aperture 13 therein. The opening 42 is closed or covered by a check-bleed valve 43, releasably secured to the container 39 and preferably threaded into and seated in the opening.

In its preferred form, the check-bleed valve 43 is a valve cartridge having a one-piece cage or casing 44 of a configuration to fit or seat in and conform to the central aperture 13 in the mounting bracket 1. The casing 44 has a central or axial bore or aperture 45 in which slides or reciprocates a differential piston 46 and which has radial ports or passages 47 connecting it to the annular groove 12 in the mounting bracket 1 onto which the intermediate passage 10 opens. Extending through the casing 44, the bore 45 opens at its outer end axially onto the annular groove 11 to which the outlet passage 8 is connected, the inner end portion 15 of the aperture 13 being suitably sealed about the casing between the grooves 11 and 12 as by an O-ring 48 carried by the casing and carrying on its outer end a valve seat 49 facing inwardly toward the adjoining side 18 of the mounting bracket 1. Shouldered as at 50 to abut against the radial wall 51 bounding the central aperture 13 between its intermediate and outer end portions 16 and 52 and preferably hex- or otherwise flatted externally to take a wrench (not shown), the relatively enlarged base or outer end portion 53 of the casing 44 has or contains a recess or socket 54 which opens onto the pressure chamber 41 and in which slides or rides a head 55 serving as the outer end of the differential piston 46.

With its head 55 exposed or presented to the pressure chamber 41, the piston 46, at its opposite end, has or carries a valve element 56 engageable with the valve seat 49 at the corresponding end of the casing 44 and normally held against that seat to block passage of fluid or communication between the grooves 11 and 12 about a reduced neck or waist 57 of the piston by a return spring 58, the latter conveniently being contained in the recess 54 and acting between the inner ends of the recess and the head 55. To permit assembly and disassembly of the casing 44 and piston 46, the valve element 56 on the piston here is formed as a separable washer held on the end of the piston by a nut 59 which extends into a confronting pocket 60 formed in the housing 21 and of sufficient depth to accommodate the range of movement of the piston.

With the recess 54, inwardly of the head 55, bled to atmosphere through a radial bleed 61 in the casing 44, the inner end portion 52 of the aperture 13 and a channel 62 conveniently formed in the side wall 40 of the container 39, so as not to resist unseating of the valve element 56 by pressure on the head, there remains the problem of charging the pressure chamber 41 to provide that pressure. Alternately connectable to or communicating with the inlet and exhaust passages 7 and 24, the intermediate passage 10 is suitable, not only to supply fluid to the line beyond the valve assembly through the bore 45 of the casing 44 between the grooves 11 and 12 on unseating of the valve element 56 of the check-bleed valve 43, but also to charge or supply and discharge or exhaust the pressure chamber 41. To suit it to such charging and discharging, the intermediate passage 10 is connected at all times to or in constant communication with the pressure chamber 41 through an orifice 63 of predetermined or selected size, cross-section or diameter which preferably is covered by a wire screen or other suitable strainer 64 to prevent entry of dirt into the pressure chamber. To permit its size to be changed or selected to suit a particular application, the orifice 63, instead of being formed in either the container 39 or the mounting bracket 1, is formed in a member separable from both and preferably carried by the container and, most conveniently, is formed in the piston 46 of the check-bleed valve 43. To this end, the orifice 63 preferably is formed as a radial port or passage, drilled or bored into the neck 57 of the piston 46, and connecting therewithin with a bore or way 65 extending from the orifice in and axially of the piston to the latter's outer or chamber-confronting end. The neck 57 being reduced in cross-section relative to the encircling or surrounding portion of the casing 44, the orifice 63 thus opens onto an annular space or compartment 66 connected, through the radial ports 47 in the casing and the encircling annular groove 12 in the bracket 1, to the intermediate passage 10. The radial spacing between the neck 57 and the portion of the casing bounding the annular space 66 also readily accommodates a tubular screen fitted over the neck and conveniently serving as the strainer 64. Since covering the end of the orifice 63 facing the intermediate passage 10, the screen 64 is virtually self-cleaning, any dirt deposited on it during charging of the pressure chamber 41 being carried off when the chamber is discharged.

With the orifice 63 constantly connected to the intermediate passage 10 in the assembled condition of the valve assembly, the opening of that passage to the inlet passage 7 and therethrough to the fluid pressure source (not shown) by actuation of the relay valve 19 will admit or supply fluid to the pressure chamber 41 until the latter is charged to the point where the pressure on the head 55 of the piston 46 of the check-bleed valve 43 is sufficient to overcome the opposing force of the return spring 58 and shift the piston to open position. On the other hand, since the orifice 63 is blocked from the outlet passage 8 so long as the valve element 56 is seated in the interposed seat 49, pressure originating in the line beyond the valve assembly is blocked from passing therethrough by the check-bleed valve. Consequently, the check-bleed valve 43 is able to perform the ordinary function of a check valve, in being openable only by pressure from one direction. However, it is after the intermediate passage 10 is cut off from the line to the pressure source by release of the actuating force on the relay valve 19 that the check-bleed valve 43 really proves its worth. The intermediate passage 10 then being connected to the exhaust passage 24 and port 25, the check-bleed valve 43, so long as it is open, will permit residual pressure in the line beyond the valve assembly to bleed to atmosphere.

Were the check-bleed valve 43 dependent for delayed closing on the residual pressure in the line beyond the valve assembly, it could remain open only so long as that pressure was sufficient to exert a force on the piston counter to and overbalancing the closing force exerted by the return spring 58. Instead, the delay in closing of the instant check-bleed valve is made a function, not of such residual pressure, but of the rate, as determined by the size of the orifice 63, at which the pressure in the pressure chamber 41 will reduce to the point where it no longer overbalances the return spring 58. It therefore is possible, by fixing the size of the orifice, for the particular installation to bleed the line beyond the assembly, as desired, either fully to atmospheric pressure or to a predetermined degree, the former generally being preferred as ensuring shutting off each of the fluid-actuated devices connected in that line. Thus, when applied to the sanding system of a diesel engine having as many as four units, the valve assembly, with an orifice of a diameter of about 0.025 in., enables the whole sand line to be dumped from a line pressure on the order of 135–140 p.s.i. to zero or atmospheric pressure in less than three seconds.

From the above detailed description, it will be apparent that there has been provided a check-bleed valve assembly which not only is simple to maintain because of the connectability of the required piping to a permanently mountable mounting bracket, the permanency of its pipe connections and the inclusion of its several working parts in subassemblies attached to and readily removable as units from the mounting bracket, but ensures that the residual pressure in the line beyond the assembly will be dumped fully when cut off from the pressure source. It should be understood that the described and disclosed embodiment is merely exemplary of the invention and that all modifications are intended to be included which do not depart from either the spirit of the invention or the scope of the appended claims.

Having described my invention, I claim:

1. A check-bleed valve assembly comprising a permanently mountable mounting bracket containing a plurality of ports connectable to external piping, housing means releasably attached to said mounting bracket, a passage in said bracket, and relay and check-bleed valves carried by said housing means and fluid-connected in series through said passage, said relay valve alternately opening to connect said passage to a pressure source and closing to connect said passage to atmosphere and said check-bleed valve permitting flow of fluid through said passage to a line therebeyond on connection thereof to said power source and checking flow therethrough in the opposite direction, and means carried by said housing means and operative on closing of said control valve for delaying closing of said check-bleed valve and enabling the line therebeyond to bleed through said passage to atmosphere.

2. A check-bleed valve assembly comprising a housing, means connected to said housing for mounting thereof on a support, a pressure chamber in said housing, a pressure-actuated check-bleed valve carried by said housing and interposable in a fluid line alternately connectable to a pressure source and to atmosphere for permitting flow through said line from said pressure source and checking flow therethrough in the opposite direction, said check-bleed valve being exposed to pressure in said chamber through an opening therein, and a permanent restricted connection between said chamber and said line in advance of said valve for delaying closing of said valve by pressure built up in said chamber during flow through said line from said pressure source.

3. A check-bleed valve assembly comprising a permanently mountable mounting bracket, an aperture in and opening onto a side of said mounting bracket, a container releasably attached to and having a side engaging said side of said bracket, an access opening to said chamber in said side of said container and aligned with said aperture, a pressure-actuated check-bleed valve removably seated in said aperture and having a casing threaded into said opening, and a passage in said bracket and alternately connectable to atmosphere and to a pressure source, said chamber and passage being constantly connected through an orifice of selected cross-section.

4. A check-bleed valve assembly comprising a permanently mountable mounting bracket, inlet and outlet ports in said bracket, a housing releasably attached to said mounting bracket, an exhaust port in said housing, an intermediate passage in said bracket and housing, a relay valve in said housing for alternately connecting said intermediate passage to said inlet and exhaust ports, a second housing releasably attached to said mounting bracket, and a check-bleed valve mounted on said second housing, said check-bleed valve being removably seated in the aperture in said bracket for controlling flow between said intermediate passage and outlet port.

5. A check-bleed valve assembly comprising a permanently mountable mounting bracket, inlet and outlet ports in said bracket, a housing releasably attached to and engaging a side of said mounting bracket, an exhaust port in said housing, an intermediate passage in said bracket and housing, a relay valve in said housing for alternately connecting said intermediate passage to said inlet and exhaust ports, a second housing releasably attached to and engaging another side of said mounting bracket, an aperture in said bracket between said intermediate passage and said outlet port and opening onto said other side of said bracket, and a check-bleed valve mounted on said second housing, said check-bleed valve removably seating in said aperture for controlling flow between said intermediate passage and outlet port.

6. A check-bleed valve assembly comprising a permanently mountable mounting bracket, inlet and outlet ports in said bracket, a housing releasably attached to and engaging a side of said mounting bracket, an exhaust port in said housing, an intermediate passage in said bracket and housing, a relay valve in said housing for alternately connecting said intermediate passage to said inlet and exhaust ports, a second housing releasably attached to and engaging another side of said mounting bracket, a fluid pressure chamber in said second housing, an aperture in said bracket between said intermediate passage and outlet port, and a fluid-actuated check-bleed valve mounted on said second housing and removably seated in said aperture, said check-bleed valve responding to pressure in said chamber for connecting and disconnecting said intermediate passage and outlet port.

7. A check-bleed valve assembly comprising a permanently mountable mounting bracket, inlet and outlet ports in said bracket, a housing releasably attached to and engaging a side of said mounting bracket, an exhaust port in said housing, an intermediate passage in said bracket and housing, a relay valve in said housing for alternately connecting said intermediate passage to said inlet and exhaust ports, a second housing releasably attached to and engaging another side of said mounting bracket, a fluid pressure chamber in said second housing, an aperture in said bracket between said intermediate passage and outlet port, a fluid-actuated check-bleed valve mounted on said second housing and removably seated in said aperture, and an orifice between and constantly connecting said intermediate passage and pressure chamber for supplying and exhausting said chamber, said check-bleed valve responding to pressure in said chamber for connecting and disconnecting said intermediate passage and outlet port.

8. A check-bleed valve assembly comprising a permanently mountable mounting bracket, inlet and outlet ports in said bracket, a housing releasably attached to and engaging a side of said mounting bracket, an exhaust port in said housing, an intermediate passage in said bracket and housing, a relay valve in said housing for alternately connecting said intermediate passage to said inlet and exhaust ports, a second housing releasably attached to and engaging another side of said mounting bracket, a fluid pressure chamber in said second housing, an aperture in said bracket between said intermediate passage and outlet port, a fluid-actuated check-bleed valve mounted on said second housing and removably seated in said aperture, and an orifice of fixed cross-section between and constantly connecting said intermediate passage and pressure chamber for supplying and exhausting said chamber, said check-bleed valve responding to pressure in said chamber for connecting and disconnecting said intermediate passage and outlet port.

9. A check-bleed valve assembly comprising a permanently mountable mounting bracket, spaced inlet, outlet and access ports in said bracket, a housing releasably attached to a side of said bracket, an exhaust port in said housing, an intermediate passage in said bracket and housing and connectable to said exhaust port through a valve chamber in said housing, a differential piston within said housing and shiftable axially in said valve chamber for alternately connecting said intermediate passage to said inlet and exhaust ports, said piston having a head received in a recess in said housing, an access passage in said bracket and housing connecting said recess above said head to said access port, spring means normally holding said piston in position to connect said intermediate passage and exhaust port, said piston on application of actuating pressure through said access port shifting to connect said intermediate passage to said inlet port, a second housing releasably attached to another side of said bracket, a pressure chamber in said second housing, an aperture in said bracket between said intermediate passage and outlet port and opening onto said other side thereof, and a check-bleed valve mounted on said second housing and exposed to said pressure chamber, said check-bleed valve removably seating in said aperture and in response to pressure in said pressure chamber controlling communication between said intermediate passage and outlet port.

10. A check-bleed valve assembly comprising a permanently mountable mounting bracket, spaced inlet, outlet and access ports in said bracket, a housing releasably attached to a side of said bracket, an exhaust port in said housing, an intermediate passage in said bracket and housing and connectable to said exhaust port through a valve chamber in said housing, a differential piston within said housing and shiftable axially in said valve chamber for alternately connecting said intermediate passage to said inlet and exhaust ports, said piston having a head received in a recess in said housing, an access passage in said bracket and housing connecting said recess above said head to said access port, spring means normally holding said piston in position to connect said intermediate passage and exhaust port, said piston on application of actuating pressure through said access port shifting to connect said intermediate passage to said inlet port, a second housing releasably attached to another side of said bracket, a pressure chamber in said second housing, an aperture in said bracket between said intermediate passage and outlet port and opening onto said other side thereof, a check-bleed valve mounted on said second housing and exposed to said pressure chamber, said check-bleed valve removably seating in said aperture and in response to pressure in said pressure chamber controlling communication between said intermediate passage and outlet port, and an orifice of selected fixed cross-section between and open to said pressure chamber and intermediate passage for regulating the rate of charge and discharge of said pressure chamber and therethrough controlling opening and closing of said check-bleed valve.

11. A check-bleed valve assembly comprising a permanently mountable mounting bracket, inlet and outlet ports in said bracket, a relay valve subassembly having a body releasably attached to a said bracket, an exhaust port in said body, an intermediate passage in said bracket and body, a relay valve reciprocable in said body for alternately connecting said intermediate passage to said inlet and exhaust ports, a check-bleed valve subassembly having a housing releasably attached to said mounting bracket, a pressure chamber in said housing, an aperture in said mounting bracket between said intermediate passage and outlet port and opening toward said housing, a check-bleed valve mounted on and exposed to said pressure chamber in said housing and removably seated in said aperture, said check-bleed valve having a piston normally blocking communication between said intermediate passage and outlet port and shiftable in response to pressure in said pressure chamber for establishing said communication, and an orifice in said piston and open therethrough to said chamber and therefrom to said intermediate passage through which said chamber is charged and discharged.

12. A check-bleed valve assembly comprising a permanently mountable mounting bracket, inlet and outlet ports in said bracket, a relay valve subassembly having a body releasably attached to said bracket, an exhaust port in said body, a relay valve reciprocable in said body for alternately connecting said intermediate passage to said inlet and exhaust ports, a check-bleed valve subassembly having a housing releasably attached to said mounting bracket, an aperture in said mounting bracket between said intermediate passage and outlet port and opening toward said housing, a check-bleed valve mounted on and exposed to said pressure chamber in said housing and removably seated in said aperture, said check-bleed valve having a piston normally blocking communication between said intermediate passage and outlet port and shiftable in response to pressure in said pressure chamber for establishing said communication, and an orifice of predetermined fixed cross-section in said piston and open therethrough to said chamber and therefrom to said intermediate passage through which said chamber is charged and discharged.

13. A check-bleed valve assembly comprising a permanently mountable mounting bracket, inlet and outlet ports in said bracket, a relay valve subassembly having a body releasably attached to said bracket, an exhaust port in said body, a relay valve reciprocable in said body for alternately connecting said intermediate passage to said inlet and exhaust ports, a check-bleed valve subassembly having a housing releasably attached to said mounting bracket, an aperture in said mounting bracket between said intermediate passage and outlet port and opening toward said housing, a check-bleed valve mounted on and exposed to said pressure chamber in said housing and removably seated in said aperture, said check-bleed valve having a piston normally blocking communication between said intermediate passage and outlet port and shiftable in response to pressure in said pressure chamber for establishing said communication, an orifice of predetermined fixed cross-section in said piston and open therethrough to said chamber and therefrom to said intermediate passage through which said chamber is charged and discharged, and a strainer between said orifice and intermediate passage.

14. A check-bleed valve assembly comprising a permanently mountable mounting bracket, inlet and outlet ports in said bracket, a relay valve subassembly having a body releasably attached to said bracket, an exhaust port in said body, a relay valve reciprocable in said body for alternately connecting said intermediate passage to said inlet and exhaust ports, a check-bleed valve subassembly having a housing releasably attached to said mounting bracket, an aperture in said mounting bracket between said intermediate passage and outlet port and opening toward said housing, a check-bleed valve mounted on and exposed to said pressure chamber in said housing and removably seated in said aperture, said check-bleed valve having a piston normally blocking communication between said intermediate passage and outlet port and shiftable in response to pressure in said chamber for establishing said communication, an orifice of predetermined fixed cross-section in said piston and open therethrough to said chamber and therefrom to said intermediate passage through which said chamber is charged and discharged, and a strainer carried by said piston and covering said orifice.

15. In a check-bleed valve assembly having spaced inlet, outlet and exhaust ports and means for alternately connecting said outlet port to said inlet and exhaust ports, the combination of a housing containing a pressure chamber, a check-bleed valve carried by said housing and including a differential piston having a head exposed to said pressure chamber, said piston being interposed and normally blocking flow between said outlet port and said connecting means and being shiftable in response to pressure in said chamber for establishing communication therebetween, and an orifice of predetermined fixed cross-section between and open to said chamber and connecting means for regulating charge and discharge of said chamber.

16. In a check-bleed valve assembly having spaced inlet, outlet and exhaust ports and means for alternately connecting said outlet port to said inlet and exhaust ports, the combination of a housing containing a pressure chamber, a check-bleed valve carried by said housing and including a differential piston having a head exposed to said pressure chamber, said piston being interposed and normally blocking flow between said outlet port and said connecting means and being shiftable in response to pressure in said chamber for establishing communication therebetween, an orifice of predetermined fixed cross-section between and open to said chamber and connecting means for regulating charge and discharge of said chamber, and strainer means covering an end of said orifice toward said connecting means.

17. In a check-bleed valve assembly having spaced inlet, outlet and exhaust ports and means for alternately connecting said outlet port to said inlet and exhaust ports, the combination of a housing containing a pressure chamber, a check-bleed valve carried by said housing and including a differential piston having a head exposed to said pressure chamber, said piston being interposed and normally blocking flow between said outlet port and said connecting means and being shiftable in response to pressure in said chamber for establishing communication therebetween, and an orifice of predetermined fixed cross-section in said piston and open therethrough to said pressure chamber and therefrom to said connecting means.

18. In a check-bleed valve assembly having spaced inlet, outlet and exhaust ports and means for alternately connecting said outlet port to said inlet and exhaust ports, the combination of a housing containing a pressure chamber, a check-bleed valve carried by said housing and including a differential piston having a head exposed to said pressure chamber, said piston being interposed and normally blocking flow between said outlet port and said connecting means and being shiftable in response to pressure in said chamber for establishing communication therebetween, an orifice of predetermined fixed cross-section in said piston and open therethrough to said pressure chamber and therefrom to said connecting means, and a strainer screen carried by said piston and covering said orifice.

References Cited in the file of this patent

UNITED STATES PATENTS

| | | |
|---|---|---|
| 1,714,545 | Burns | May 28, 1929 |
| 1,874,793 | Nightingale | Aug. 30, 1932 |
| 2,711,270 | Gulbrandsen | June 21, 1955 |
| 2,754,840 | Hicks | July 17, 1956 |
| 2,825,360 | Hicks | Mar. 4, 1958 |

FOREIGN PATENTS

| | | |
|---|---|---|
| 695,218 | Great Britain | Aug. 5, 1953 |